Sept. 20, 1971     R. L. BRENNER     3,605,267
CARPET TRIMMING TOOL
Filed March 21, 1969     2 Sheets-Sheet 1
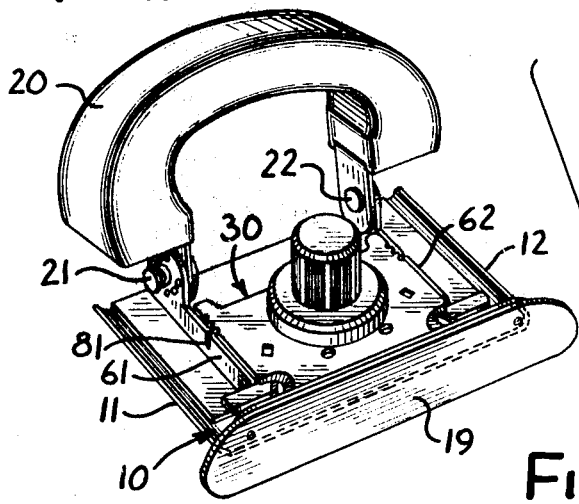
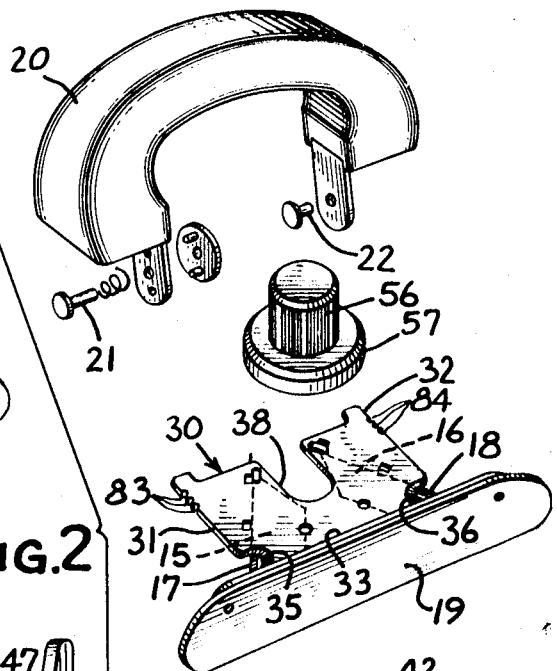
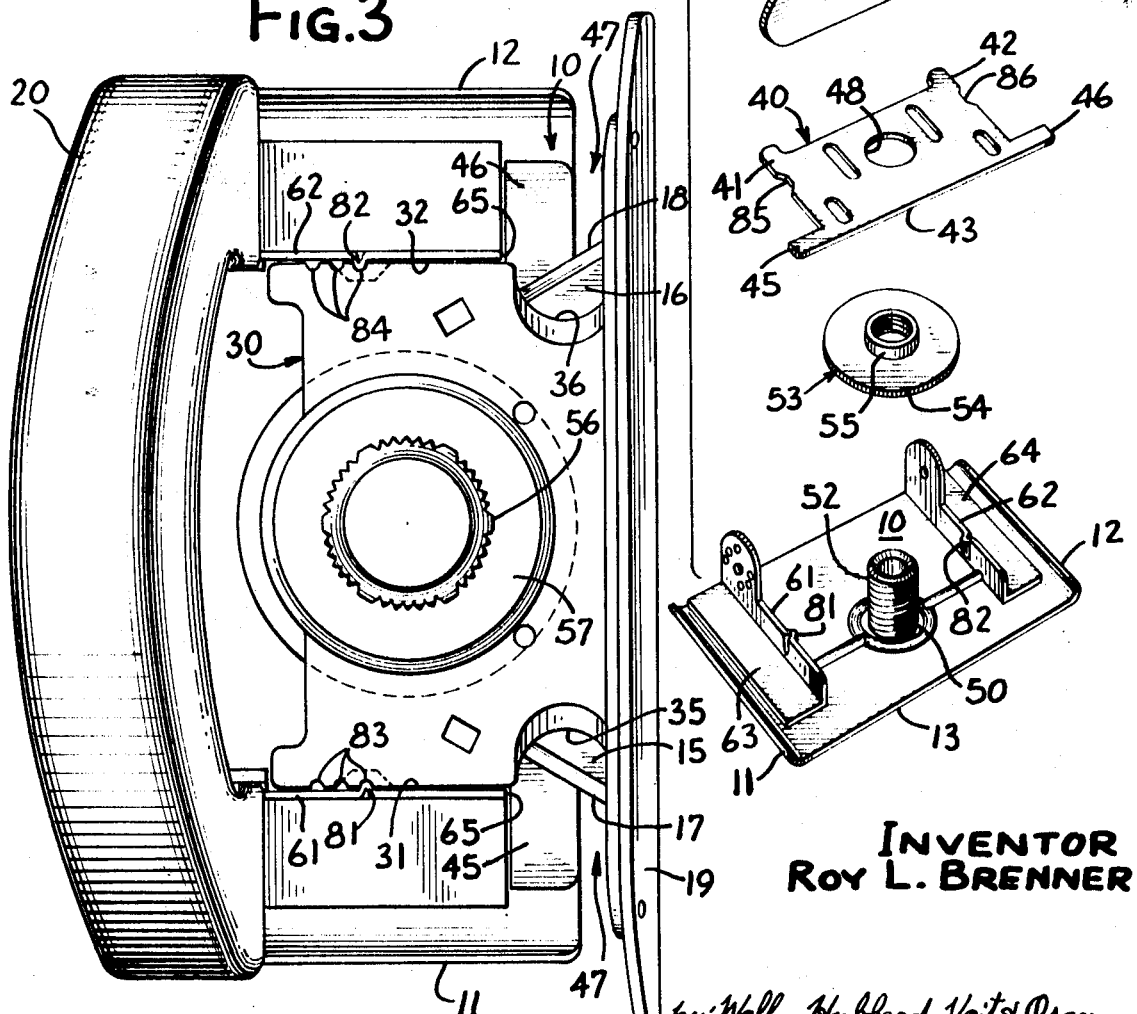
INVENTOR
ROY L. BRENNER
by: Wolfe, Hubbard, Voit & Osann
ATTYS.

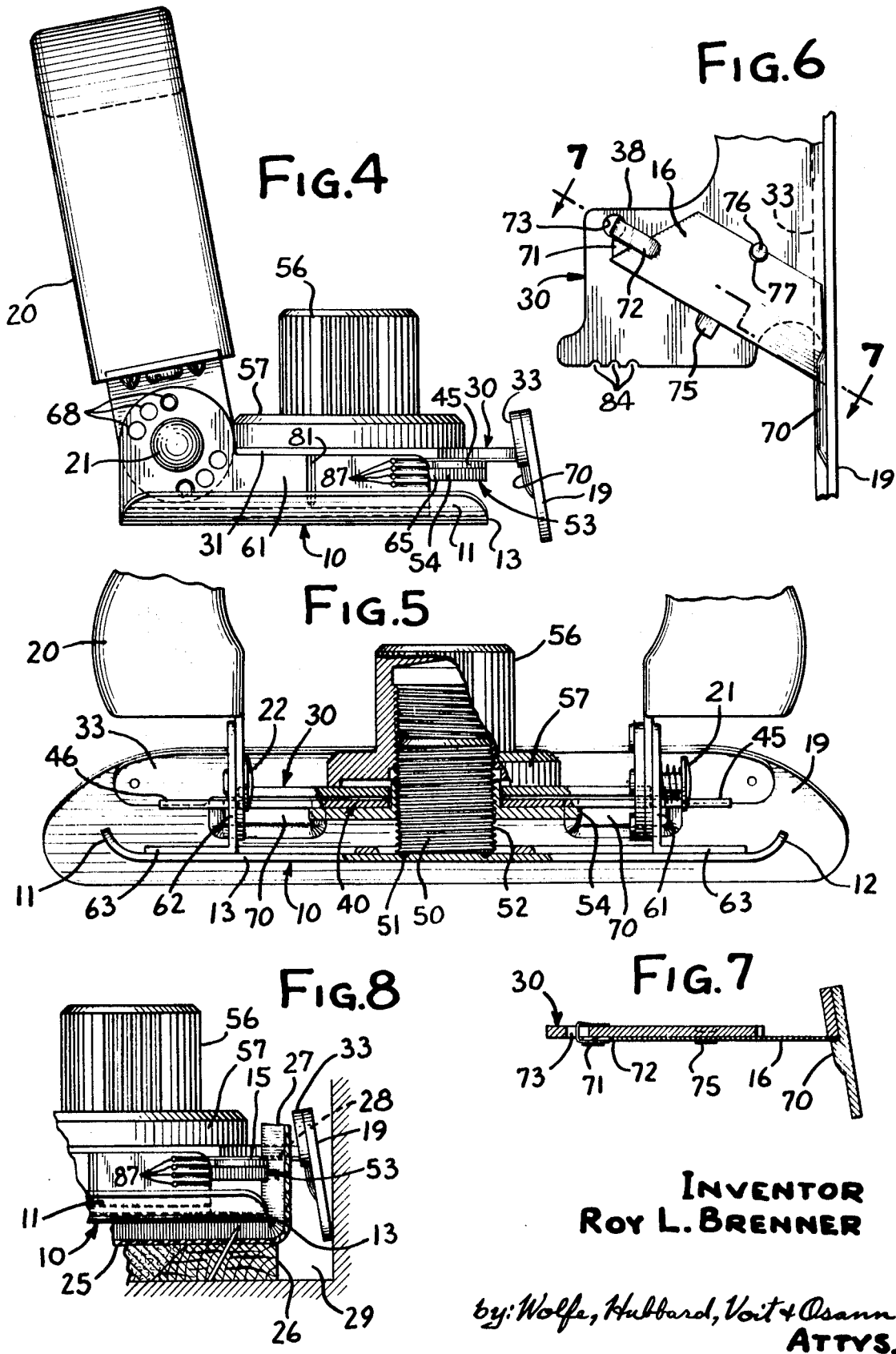

United States Patent Office 3,605,267
Patented Sept. 20, 1971

3,605,267
CARPET TRIMMING TOOL
Roy L. Brenner, Highland Park, Ill., assignor to Kinkead Industries Incorporated, Chicago, Ill.
Filed Mar. 21, 1969, Ser. No. 809,238
Int. Cl. B26b 29/00
U.S. Cl. 30—287
8 Claims

ABSTRACT OF THE DISCLOSURE

A tool for trimming carpet to fit against a wall or baseboard having a base plate for riding along the carpet and an assembly which includes a blade holder plate and reference plate mounted on a threaded post and having clamping nuts for clamping the assembly in a position of vertical adjustment to provide the desired cutting height. The blade holder plate has a relative horizontal adjustment to establish the width of an entry slot for confining carpet of different thickness as it is being cut. Improved means are provided for preventing relative rotational and in and out movement of the plates when clamped in working position.

---

It is an object of the present invention to provide a carpet trimming tool which is efficient in operation, which is capable of handling many different types and thicknesses of carpet while providing an adjustable amount of "tuck," and which is quickly and easily adjustable by the carpet installer without necessity for disassambly.

It is another object of the present invention to provide a carpet trimming tool which may be adjusted for cutting height and thickness of carpet and in which the condition of adjustment is reliably maintained by turning of a single relatively massive clamping nut, or knob, which is readily accessible and unobstructed at the top of the cutter and which minimizes the possibility of the device slipping out of adjustment during heavy usage. It is, finally, an object of the invention to provide a carpet trimmer which is made up of a minimum number of parts easily and logically assembled and which permits rapid replacement of a cutting blade when a fresh blade becomes necessary.

Other objects and advantages of the invention will become apparent upon reading the attached detailed description and upon reference to the drawings in which:

FIG. 1 is a general perspective view of a carpet trimmer constructed in accordance with the invention;

FIG. 2 is an exploded view of the device of FIG. 1;

FIG. 3 is a plan view of the carpet trimmer;

FIGS. 4 and 5 are a side elevation and rear elevation respectively of the carpet trimmer, partially in section;

FIG. 6 is a fragmentary view of the underside of the blade holder plate showing the manner in which a blade is held in position;

FIG. 7 is a fragmentary section taken along the line 7—7 in FIG. 6; and

FIG. 8 is a fragmentary "corner" section showing the trimming of the edge of a carpet.

While the invention has been described in connection with a preferred embodiment, it will be understood that I do not intend to be limited to the particular embodiment shown but, on the contrary, intend to cover all alternatives, modifications and equivalents included within the spirit and scope of the invention.

Turning now to the drawings, the trimming tool includes a flat base plate 10 in the form of a generally rectangular plate of metal having turned up ends as indicated at 11, 12 for riding upon the nap or pile of a carpet and a lateral edge 13. Means are provided above the lateral edge for mounting horizontal, angled cutting blades 15, 16 having edges 17, 18 which face outwardly in opposite directions and which lie adjacent a vertically arranged guide member 19. A handle 20, which is secured to the base plate by means of hinge pins 21, 22, is in the shape of an arch, symmetrically formed to enable the trimmer to be pushed in opposite dicetions at the will of the user.

Referring to FIG. 8 which shows the intended mode of use, the carpeting 25 is anchored to a so-called tackless strip 26 to provide an upwardly turned edge 27 which is trimmed by one of the cutter blades as the device is pushed along with the guide member 19 riding in contact with the wall for gauging purposes. After trimming, the trimmed edge 28 of the carpet is tucked into the space 29 back of the tack strip using the curved ends of the guide 19 to do the tucking.

In accordance with the invention a blade holder plate is provided having an adjacent reference plate mounted on a threaded post with provision for clamping at an adjusted height and with novel provision for lateral adjustment to vary the width of the entry slot so as to confiningly accommodate carpet having a wide range of thickness. As shown in the drawings, the blade holder plate, indicated at 30, has end edges 31, 32 and an upwardly bent side flange 33 to which the vertical guide member 19 is secured, as by welding. Formed in the edges 31, 32 of the blade holder plate in a position adjacent the guide member are notches 35, 36 across which the blades 15, 16 are arranged in bridging position, the edges of the notches being suitably chamfered to permit free passage of the severed edge of the carpet. Cut into the back edge of the blade holder plate is a clearance opening 38.

Mounted flatly adjacent the blade holder plate 30, preferably along its underside is a reference plate 40 having end edges 41, 42 and a reference edges 43. The reference edge is projected beyond the blade positions by providing intgral extensions 45, 46, which define entry slots 47. Centrally formed in the reference plate is a clearance opening 48.

For the purpose of clamping the assembly of the blade holder plate 30 and reference plate 40, with the blades 15, 16 securely sandwiched between them, a relatively massive, threaded mounting post is provided at the center of the base plate having a supporting nut which underlies the reference plate and a clamping nut which is screwed down on top of the blade holder plate. This post, indicated at 50, is preferably of hollow construction welded at 51 to the base plate and having a thread 52. Screwed onto the post is a supporting nut 53 of disk shape having a knurled outer edge 54 which is accessible, behind the reference plate, for finger tip adjustment and which preferably has an integral collar 55 providing a smooth cylindrical reference surface for the clearance openings 38, 48, on the plates. With the two plates 30, 40 assembled on the post, a clamping nut in the form of a knob 56 having a flange 57 is turned tight in uppermost position.

For the purpose of preventing skewing or relative rotation when the plates 30, 40 are assembled on the post, the plates are confined between upstanding guides arranged in opposed position at the ends of the base plate. Such guides, indicated at 61, 62 (FIG. 5) are in the form of small lengths of angle, the bases 63, 64 of which are welded or otherwise secured to the base plate. Preferably the end edges 31, 32 of the plate 30 and 41, 42 of the plate 40 are dimensioned so as to be flush with one another for snug engagement between the opposed guide surfaces. Preferably also the angles are extended, as indicated at 65 (FIG. 4) into abutting position behind the extensions 45, 46 of the reference plate. The effect is to hold both of the plates 30, 40 captive against skewing movement on the base plate and to restrain the plates against any possibility of relative movement with respect to one another, particularly when the trimmer is subjected to hard usage. The vertical guide members 61, 62 extend to a sufficient height as to perform their function over the entire range of vertical adjustment of the clamped plates. Conveniently, the handle hinge pins 21, 22 may be received in the guide members 61, 62 so that the latter do double duty. The hinge pin 21 is preferably so constructed as to permit the handle 20 to be locked in a selected one of a series of angled positions corresponding to the openings 68 (FIG. 4).

Means are provided for temporarily retaining the cutter blades in assembled position on the blade holder plate until the latter is clamped against the reference plate. As shown in FIGS. 6 and 7, the blade 16 is held captive at both of its ends. At its active end, the edge of the blade is held between the lower edge of the flange 33 on the supporting plate and an embossment 70 formed on the guide member. At its inner end the blade is held against an embossment 71 by means of a spring clip 72 which is of C shape and which extends through an opening 73 formed in the plate. Lateral movement of the blade is prevented by square and circular embossments 75, 76, the latter registering with a positioning scallop 77 formed along one lateral edge of the blade. To assemble the blade to the plate, it is simply slipped between the embossments and retained temporarily by the spring clip 72. When the plates 30, 40 are clamped together, the blade is securely sandwiched between them, being positively retained in the grip of the embossments regardless of the forces to which the blade may be subjected.

To adjust the cutting height it is a simple matter to loosen the clamping knob 56 and to rotate the supporting nut 50 to appropriate height with light fingertip pressure.

For the purpose of locking the blade plate at a selected one of a series of lateral positions thereby to vary the width of the entry slots 47, while at the same time permitting adjustment of cutting height, a vertical tongue and groove connection is provided between the blade holder plate 30 and the guide members 61, 62 at the respective ends thereof. The tongue and groove connection preferably includes a tongue in the form of an inwardly facing vertical rib or embossment 81, 82 (FIGS. 2 and 3) on the respective guide members 61, 62 cooperating with a series of registering grooves or notches 83, 84 on the ends 31, 32 of the blade holder plate. Enlarged clearance notches 85, 86 are in addition provided in the ends of the reference plate but any detenting engagement between the blade holder plate and reference plate is specifically avoided. A scale 87 (see FIG. 4) indicates the height adjustment.

In use, the reference plate is lowered over the post. This is followed by the blade holder plate with selected ones of the notches 83, 84 registering with the vertical ribs 81, 82 on the guide members, depending upon the desired width of the entry slots 47. With the blade holder plate thus positioned at a height which will provide the desired amount of "tuck" into the space 29 behind the tackless strip, and with the blade holder plate laterally positioned to provide a width of entry slot which will snugly confine the carpet as it is cut, the clamping nut 56 is screwed tight, thereby holding the parts rigidly assembled.

Readjustment is a simple matter of loosening the clamping nut for movement of the supporting nut 50 upwardly or downwardly, or to move the blade holder plate in or out, following which the clamping nut is again screwed tight. The nut is sufficiently large and sufficiently accessible so that adequate clamping pressure can be developed with ordinary fingertip pressure. It is to be particularly noted that no disassembly is required for the shuffling of spacer plates which is necessary in the use of trimmers of more conventional design.

It will be apparent that the present trimmer is not only easily adjusted and efficient in its operation, but it consists of a minimum number of logically assembled and simply formed parts so that it may be used by any carpet installer without special instruction or experience.

While the term "nut" has been employed for convenience in referring to the clamping knob, it will be understood that this has to do with the fact that the knob threadedly engages the post and it will be appreciated by one skilled in the art that while the knob, in the preferred embodiment, surrounds the post, the knob could, if desired, have a portion which is threaded to engage an internal thread on the post without in any way departing from the clamping function. Also while the term "supporting nut" has been used, it is the supporting function which is paramount and the term thus includes any supporting member capable of positioning the blade holder plate at a desired cutting height.

I claim:

1. In a carpet trimmer the combination comprising a flat base plate, a massive threaded central post mounted thereon, a blade holder plate on said post spaced above the base plate and projecting beyond the edge of the base plate, said blade holder plate having provision for mounting cutter blades in oppositely facing angled positions, a vertical guide member secured to the projecting edge of the blade holder plate, a reference plate on the post arranged flatly adjacent the blade holder plate and presenting an outer edge which is parallel to guide member and which extends longitudinally beyond the blades to define entry slots for confiningly guiding an upwardly turned edge of carpet into engagement with one of the blades, adjustable clamping means including a pair of massive nuts on said post for clamping the reference plate and blade holder plate flatly together at a desired cutting height thereby to change the amount of available tuck at the edge of the carpet, the blade holder plate having provision for relative lateral adjusting movement with respect to the reference plate to change the effective width of the entry slot for accommodation of different thicknesses of carpet, blocking means upstanding on the base plate for engaging the combined blade holder plate and reference plate for blocking relative rotation of the clamped plates about the post at all cutting heights, and handle means for propelling the base plate parallel to the wall.

2. In a carpet trimmer, the combination comprising a flat base plate, a massive central post mounted thereon and having a thread formed in the outside surface thereof, a blade holder plate telescoped over the post in spaced position above the base plate and projecting beyond the edge of the base plate, a vertical guide member secured to the projecting edge of the blade holder plate, said blade holder plate having provision for mounting cutter blades in oppositely facing angled positions adjacent the guide member, a reference plate arranged flatly with respect to the blade holder plate and presenting an outer edge which is parallel to the guide member and which extends longitudinally beyond the blades to define entry slots confiningly guiding an upwardly turned edge of carpet into engagement with one of the blades, cooperating upper and lower nuts threaded onto the central post for clamping the reference plate and blade holder plate flatly together at a desired cutting height above the base plate thereby to change the amount of available tuck at the edge of the carpet, at least one of the clamped plates having provision for relative lateral adjusting movement with respect to the other to change the effective width of the entry slots for accommodation of different thicknesses of carpet, handle means for propelling the base plate parallel to the wall, means on the base plate for preventing relative rotation of the clamped plates about the post, the lower nut being in the form of a disc having a knurled edge of sufficient radius as to project out from under the reference plate for manual manipulation.

3. In a carpet trimmer, the combination comprising a flat base plate having a lateral edge, a threaded post mounted on the base plate, a reference plate having a post opening formed therein and telescoped over the post, said reference plate having a lateral edge which is substantially alined with the lateral edge of the base plate, a blade holder plate having a post clearance opening and arranged flatly above the reference plate, a vertical guide member secured to the outer edge of the blade holder plate, said blade holder plate having provision for mounting cutter blades in oppositely facing angled positions and being laterally movable with respect to the reference plate thereby to define an entry slot of variable width for guiding an upwardly turned edge of carpet into engagement with one of the blades, a supporting nut on the post, a clamping nut above the blade holder plate for clamping the blade holder plate and reference plate in adjusted position, means for maintaining the plates in alinement in all of their adjusted positions, and handle means for propelling the base plate parallel to the wall.

4. The combination as claimed in claim 3 in which abutments are provided on the blade holder plate for confining each blade against movement in its plate, and means including a spring clip for holding the blades in temporary engagement with the blade holder plate prior to clamped assembly with the reference plate.

5. In a carpet trimmer the combination comprising a flat base plate, a central threaded post mounted thereon, a reference plate having a clearance opening telescoped over the post and presenting a lateral edge in substantial alinement with the lateral edge of the base plate, a blade holder plate flatly seated on top of the reference plate and having provision for mounting cutter blades along its outer edge in oppositely facing angled positions, a vertical guide member secured to the outer edge of the blade holder plate, the end surfaces of the blade holder plate and reference plate being flush with one another, upstanding guides arranged in opposed position at the ends of the base plate for engaging the flush end surfaces of the reference plate and blade holder plate for keeping the plates in alinement, said post having a supporting nut and a clamping nut for clamping the reference plate and blade holder plate in a desired position of vertical and lateral adjustment.

6. In a carpet trimmer the combination comprising a flat base plate, a central threaded post mounted thereon, a reference plate having a clearance opening telescoped over the post and presenting a lateral edge in substantial alinement with the lateral edge of the base plate, a blade holder plate flatly seated on top of the reference plate for lateral adjustment and having provision for mounting cutter blades along its outer edge in oppositely facing angled positions, a vertical guide member secured to the outer edge of the blade holder plate, the end surfaces of the blade holder plate and reference plate being flush with one another, upstanding guides arranged in opposed position at the ends of the base plate for engaging the flush end surfaces of the reference plate and blade holder plate for keeping the plates in alinement, a vertical rib on each of the guides, the end surfaces of the blade holder plate each having a series of grooves for selective engagement by the respective ribs on the guides thereby to determine the position of lateral adjustment of the blade holder plate, said post having a supporting nut and a clamping nut for clamping the reference plate and blade holder plate in the desired relative position of vertical and lateral adjustment.

7. In a carpet trimmer the combination comprising a flat base plate, a central threaded post mounted thereon, a blade holder plate having a clearance opening for engaging the post and having provision for mounting cutter blades along its outer edge in oppositely facing angled positions, a vertical guide member secured to the outer edge of the blade holder plate, upstanding guides arranged in opposed position at the ends of the base plate for engaging the end surfaces of the blade holder plate, means defining tongue and groove connections interposed between the ends of the blade holder plate and the adjacent guide members registerable in a plurality of positions for fixing the position of lateral adjustment of the blade holder plate with respect to the base plate, said post having a supporting nut and a clamping nut for clamping the blade holder plate in the desired position of vertical and lateral adjustment.

8. In a carpet trimmer the combination comprising a flat base plate, having a lateral edge, a reference plate above the base plate presenting a lateral edge in substantial alinement with the lateral edge of the base plate, a blade holder plate flatly seated on top of the reference plate and having provision for mounting cutter blades along its outer edge in oppositely facing angled positions, a vertical guide member secured to the outer edge of the blade holder plate, the end surfaces of the blade holder plate and reference plate being flush with one another, upstanding guides arranged in opposed position at the ends of the base plate for engaging the flush end surfaces of the reference plate and blade holder plate for keeping the plates in alinement, a vertical rib on each of the guide members, the end surfaces of the blade holder plate each having a series of grooves for selective engagement by the respective ribs on the guide members thereby to determine the position of lateral adjustment of the blade holder plate, said reference plate having clearance grooves for accommodating the ribs, and clamping means on the base plate for clamping the reference plate and blade holder plate together in a desired vertical position and with the blade holder plate in its desired position of lateral adjustment.

References Cited
UNITED STATES PATENTS

| | | | |
|---|---|---|---|
| 2,772,474 | 12/1956 | Hill | 30—293 |
| 3,363,314 | 1/1968 | O'Brien | 30—293X |
| 3,382,579 | 5/1968 | Prater | 30—293X |
| 3,395,453 | 8/1968 | Prater | 30—293 |

ROBERT C. RIORDON, Primary Examiner

J. C. PETERS, Assistant Examiner

U.S. Cl. X.R.

30—293